United States Patent
Durkovic

(10) Patent No.: US 11,130,520 B2
(45) Date of Patent: Sep. 28, 2021

(54) STEERING ASSEMBLY FOR A MOTOR VEHICLE, AND MOTOR VEHICLE

(71) Applicant: Bayerische Motoren Werke Aktiengesellschaft, Munich (DE)

(72) Inventor: Martin Durkovic, Zvolen (SK)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 54 days.

(21) Appl. No.: 16/677,019

(22) Filed: Nov. 7, 2019

(65) Prior Publication Data

US 2020/0070881 A1 Mar. 5, 2020

Related U.S. Application Data

(63) Continuation of application No. PCT/EP2018/056701, filed on Mar. 16, 2018.

(30) Foreign Application Priority Data

May 8, 2017 (DE) ...................... 10 2017 207 723.9

(51) Int. Cl.
*B62D 7/16* (2006.01)
*B60G 3/06* (2006.01)

(52) U.S. Cl.
CPC ................. *B62D 7/16* (2013.01); *B60G 3/06* (2013.01); *B60G 2200/44* (2013.01)

(58) Field of Classification Search
CPC ... B62D 7/06; B62D 7/16; B60G 3/06; B60G 3/18; B60G 3/20; B60G 2200/44; B60G 2200/144; B60G 2200/156
See application file for complete search history.

(56) References Cited

U.S. PATENT DOCUMENTS

| 4,798,396 | A | | 1/1989 | Minakawa |
| 5,129,477 | A | * | 7/1992 | Hurlburt ................. B60G 9/02 180/265 |

(Continued)

FOREIGN PATENT DOCUMENTS

| AT | 387 545 B | 2/1989 |
| CN | 203426949 U | 8/2013 |

(Continued)

OTHER PUBLICATIONS

Lenhard-Backhaus, Hugo Dipl Ing. "Translation of AT 387545 B Obtained Mar. 24, 2021 from Google Translate". Feb. 10, 1989. Whole Document. (Year: 1989).*

(Continued)

*Primary Examiner* — James A English
*Assistant Examiner* — Scott F. Underwood
(74) *Attorney, Agent, or Firm* — Crowell & Moring LLP

(57) ABSTRACT

A steering assembly for a motor vehicle has a wheel carrier to which a wheel can be secured, a strut via which the wheel carrier is mounted on a vehicle body in an articulated manner, a first transverse link mounted on the wheel carrier in an articulated manner, and a second transverse link mounted on the wheel carrier in an articulated manner. The first transverse link and the second transverse link are coupled to one another on their side facing away from the wheel carrier by a connection member. The connection member is rotatably mounted on the vehicle body.

13 Claims, 4 Drawing Sheets

(56) References Cited

U.S. PATENT DOCUMENTS

| | | | |
|---|---|---|---|
| 6,161,853 A | 12/2000 | Jung | |
| 6,561,307 B1 | 5/2003 | Brill et al. | |
| 7,487,985 B1 * | 2/2009 | Mighell | B62K 5/027 |
| | | | 180/210 |
| 2016/0280284 A1 | 9/2016 | Scholz et al. | |
| 2017/0253099 A1 * | 9/2017 | Durkovic | B60G 3/265 |
| 2019/0161114 A1 * | 5/2019 | Yamazaki | B62D 17/00 |

FOREIGN PATENT DOCUMENTS

| | | | |
|---|---|---|---|
| CN | 105793146 A | 7/2016 | |
| DE | 25 35 670 A1 | 2/1977 | |
| DE | 3146612 A1 * | 6/1983 | B62D 7/16 |
| DE | 37 21 026 A1 | 1/1988 | |
| DE | 602 11 352 T2 | 2/2007 | |
| DE | 10 2006 046 241 A1 | 4/2008 | |
| DE | 10 2011 081 543 A1 | 2/2013 | |
| EP | 0 348 214 A2 | 12/1989 | |
| EP | 1 426 203 A1 | 6/2004 | |
| FR | 2 600 594 A1 | 12/1987 | |
| JP | 11-227434 | 8/1999 | |
| WO | WO 2004/009383 A1 | 1/2004 | |
| WO | WO 2010/047642 A1 | 4/2010 | |
| WO | WO-2010140237 A1 * | 12/2010 | B60G 3/20 |
| WO | WO-2019045109 A1 * | 3/2019 | B62D 9/02 |

OTHER PUBLICATIONS

International Search Report (PCT/ISA/210) issued in PCT Application No. PCT/EP2018/056701 dated Jul. 2, 2018 with English translation (six (6) pages).

German-language Written Opinion (PCT/ISA/237) issued in PCT Application No. PCT/EP2018/056701 dated Jul. 2, 2018 (five (5) pages).

German-language Search Report issued in German Application No. 10 2017 207 723.9 dated Aug. 10, 2020 with partial English translation (13 pages).

Chinese-language Office Action issued in Chinese Application No. 201880027409.9 dated Jun. 3, 2021 with English translation (13 pages).

* cited by examiner

STEERING ASSEMBLY FOR A MOTOR VEHICLE, AND MOTOR VEHICLE

CROSS REFERENCE TO RELATED APPLICATIONS

This application is a continuation of PCT International Application No. PCT/EP2018/056701, filed Mar. 16, 2018, which claims priority under 35 U.S.C. § 119 from German Patent Application No. 10 2017 207 723.9, filed May 8, 2017, the entire disclosures of which are herein expressly incorporated by reference.

BACKGROUND AND SUMMARY OF THE INVENTION

The invention relates to a steering assembly for a motor vehicle, including a wheel carrier to which a wheel can be fastened, and a strut via which the wheel carrier is mounted on a vehicle body in an articulated manner.

In addition, the invention relates to a motor vehicle having such a steering assembly.

Motor vehicles of this type and steering assemblies of this type are known from the prior art. They are used to permit motor vehicles to corner. For this purpose, a motor vehicle generally includes two steering assemblies on a steerable axle. One steering assembly is then assigned, for example, to a left wheel and another steering assembly to a right wheel.

For cornering, the steerable wheels are conventionally pivoted in a complex movement. This movement results in a rotation of the wheels about a substantially vertical axis. A wheel on the outside of the bend is generally turned in less sharply here, i.e. rotated less, than a wheel on the inside of the bend. It is thus possible for the two wheels to each run on a circular path and for the two circular paths to have a common center point. The center point may also be referred to as a virtual pivot point or center point of the bend.

During the turning-in of the wheels, the latter move section by section in the direction of a motor vehicle interior and section by section in the direction of a motor vehicle exterior. The greater the steering angle or turning-in angle, the further a wheel section moves in the direction of the motor vehicle interior.

During the design of a motor vehicle, a corresponding body-side clearance therefore has to be provided for this movement of the wheels.

Owing to the general endeavor to provide motor vehicles with as small a turning circle or track circle diameter as possible so that the motor vehicles are particularly maneuverable, and owing to the simultaneous objective of providing as much space as possible within the motor vehicle body, a conflict of objectives arises. This space within the vehicle body can be provided both for technical devices of the motor vehicle and also for the passenger compartment.

This conflict of objectives is conventionally resolved by the track circle diameter or turning circle of a motor vehicle being downwardly limited, and therefore only a limited clearance for the movement of the steerable wheels has to be provided on the body side.

It is the object of the invention to further improve steering assemblies and motor vehicles of the type mentioned at the beginning. In particular, the abovementioned conflict of objectives is intended to be at least partially resolved by providing a steering assembly and a motor vehicle which are both provided with a particularly small turning circle and, on the body side, have a large amount of space for the technical vehicle devices and/or the passengers. The clearance to be kept ready for the wheels is therefore intended to be as small as possible.

The object is achieved by a steering assembly of the type mentioned at the beginning which comprises a first transverse link mounted on the wheel carrier in an articulated manner, and a second transverse link mounted on the wheel carrier in an articulated manner, wherein the first transverse link and the second transverse link are coupled to each other in each case on their side facing away from the wheel carrier by way of a connecting member, and wherein the connecting member is mounted rotatably on the vehicle body. An articulated mounting should be understood here as meaning in particular a rotational mounting. For example, the wheel-carrier-side bearing of the strut is a ball and socket joint. The vehicle-body-side bearing of the strut can be a ball and socket joint or rubber bearing. As far as the first and the second transverse link are concerned, the associated wheel-carrier-side bearings and the connecting-member-side bearings can be ball and socket joints. The vehicle-body-side bearing of the connecting member is preferably a rotary bearing, i.e. has substantially only one rotational degree of freedom. The two transverse links are therefore not connected to the vehicle body directly, but rather indirectly via the connecting member. This permits particularly large steering angles for a wheel fastened to the wheel carrier. At the same time, the clearance provided on the body side for the turned-in wheel can be kept relatively short. Furthermore, with such a steering assembly, a comparatively large construction space can be provided for a wheel brake.

The first transverse link and second transverse link preferably run substantially parallel and/or are substantially the same length. In more precise terms, the directions of action of the transverse links, i.e. the connecting lines between the wheel-carrier-side bearings and the connecting-member-side bearings, run parallel and the distances between mutually assigned wheel-carrier-side and connecting-member-side bearings are identical in size. A steering assembly design which is advantageous in respect of forces and torques is therefore produced. Depending of the situation, the transverse links may each absorb half of the occurring forces. This is also expedient in terms of manufacturing since the transverse links can be designed as identical parts.

The first transverse link, the second transverse link and/or the connecting member can lie in a common, substantially horizontally running plane. Said plane also lies substantially parallel to a carriageway, with respect to which the steering assembly steers. This design achieves a particularly large construction space for a wheel brake and/or a spring-damper system.

Advantageously, the connecting member is connected to an actuator assembly and is rotatable by means of the latter in relation to the vehicle body. The actuator assembly can comprise electric motors designed in particular as rotary actuators. Alternatively, rotary actuators or linear actuators can also be used together with a transmission unit which accordingly constitutes an actuator assembly. Examples of linear actuators are hydraulic cylinders, pneumatic cylinders or electric linear axles. By directly coupling the connecting member to an actuator assembly, first of all a spatially compact design is achieved. Secondly, a particularly dynamic and precise activation of the wheel to be steered can thus take place. This results in a particularly direct and agile steering sensation for the driver.

The steering assembly is preferably designed as a steer-by-wire assembly. A mechanical coupling between a steering wheel and the steering assembly can therefore be omitted. This furthermore saves on construction space. Furthermore, the steering assembly can be operated in a simple manner with different characteristics relating, for example, to the translation of a steering command emanating from the steering wheel into a steering movement of the wheels. It is thus also possible to provide a driver with situation-adapted feedback via the steering wheel.

In one embodiment, the connecting member is rotatable in relation to the vehicle body substantially about a vertical axis. A requirement for construction space is thus as small as possible with a turning circle which is as small as possible.

According to one development, the connecting member comprises a first connecting arm which connects a body-side bearing of the connecting member to a connecting-member-side bearing of the first transverse link, and a second connecting arm which connects the body-side bearing of the connecting member to a connecting-member-side bearing of the second transverse link. From a mechanical aspect, the connecting-member-side bearings of the transverse links are therefore each connected to the body via a lever. From a drive technology aspect, the transverse links are driven via said levers. This implies the reinforcing and translation effects known in the case of levers. At the same time, the two arms are coupled to each other, and therefore the first transverse link and the second transverse link are always moved in a manner coordinated with each other. The construction of the steering assembly is therefore particularly simple and space-saving.

Preferably, the connecting-member-side bearing of the first transverse link and/or the connecting-member-side bearing of the second transverse link are ball bearings or is a ball bearing. The bearings can be designed here as rotary joints or as what are referred to as rubber bearings. The mounting is therefore precise and durable. Both the connecting-member-side bearing of the first transverse link can therefore be designed as a ball bearing as can also the connecting-member-side bearing of the second transverse link. The ball bearings ensure that rotation about all three axes in space is possible.

In one variant, the first connecting arm and the second connecting arm enclose a connecting member angle facing away from the wheel carrier, wherein the connecting member angle is smaller than 180°, and therefore the body-side bearing of the connecting member is offset in relation to the connecting-member-side bearings of the first transverse link and of the second transverse link in the direction of the wheel carrier in a neutral position of the steering assembly. The neutral position corresponds here to that position of the wheel carrier which the latter assumes during straight-ahead travel. The connecting member angle can be obtuse or oblique. It is possible via a distance between the two transverse links and the size of the angle to set how far the body-side bearing of the connecting member is offset in relation to the connecting-member-side bearings of the transverse links in the direction of the wheel carrier. The turning-in behavior of the steering assembly is therefore also set. In particular, it is possible via the selection of the angle to set how far the wheel carrier, and therefore a wheel fastened thereto, migrates along a motor vehicle axle toward the vehicle interior during the turning-in operation. In comparison to known steering assemblies, a steering assembly can thus be realized in which the wheel migrates relatively little along the motor vehicle axle toward the vehicle interior during the turning-in operation. This effect results in a significant reduction in the clearance to be held ready for the turning-in wheel. The steering assembly according to the invention therefore requires only a particularly little clearance. The space thereby becoming free within the vehicle body can be used for components of an electric drive, in particular for electrical energy stores.

The first transverse link, the second transverse link and the struts can each be mounted on the wheel carrier in a manner spaced apart from one another. Particularly stable and reliable support of the wheel carrier on the vehicle body thus arises. Furthermore, a wheel fastened to the wheel carrier can thus be turned in precisely and reproducibly.

A wheel-carrier-side bearing of the first transverse link and a wheel-carrier-side bearing of the second transverse link can also be spaced apart from each other along a wheel carrier longitudinal direction. The wheel carrier longitudinal direction corresponds here to a vehicle longitudinal direction when the wheel carrier and therefore a wheel fastened thereto is in the straight-ahead position. The wheel carrier longitudinal direction also corresponds to a direction of travel, provided that vehicle axle which comprises the steering assembly is a front axle.

A wheel-carrier-side bearing of the strut can be arranged here between the wheel-carrier-side bearing of the first transverse link and the wheel-carrier-side bearing of the second transverse link. In the event that the wheel-carrier-side bearings of the first and of the second transverse link are spaced apart from each other along a wheel carrier longitudinal direction, the wheel-carrier-side bearing lies between the two wheel-carrier-side transverse link bearings in the wheel carrier longitudinal direction. All of the wheel-carrier-side bearings are therefore arranged on a line. This ensures a compact construction of the steering assembly.

In one variant, a vehicle-body-side bearing of the strut is spaced apart from a vehicle-body-side bearing of the connecting member. A mechanically stable supporting of the wheel carrier and of a wheel mounted thereon on the motor vehicle is therefore produced.

Furthermore, the object is achieved by a motor vehicle with a steering assembly according to the invention, in particular wherein a wheel is fastened to the wheel carrier. Such a motor vehicle has a particularly small turning circle and is therefore particularly readily maneuverable. At the same time, only a relatively small body-side clearance for the turning-in of the wheels has to be provided in such a motor vehicle. This creates additional construction space within the body, which construction space can be used, for example, as a passenger compartment or as a construction space for drive components. In particular, the additional construction space can be used for components of an electric drive, preferably an electrical energy store.

According to one development, the motor vehicle comprises two steering assemblies according to the invention, wherein the two steering assemblies complement each other to form a steerable motor vehicle axle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
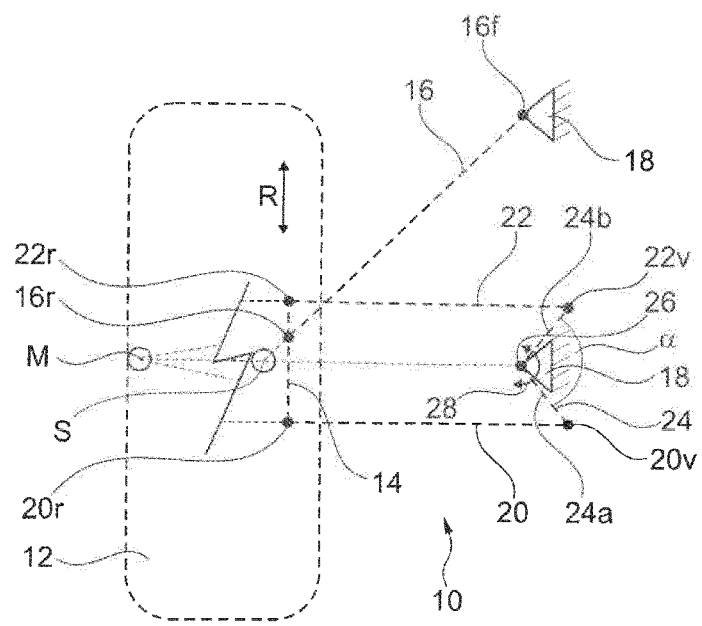
FIG. 1 is a top view of a steering assembly according to an embodiment of the invention of a motor vehicle in a neutral position.

FIG. 1 shows a steering assembly 10 on which a wheel 12 is mounted. In more precise terms, the wheel 12 is attached to a wheel carrier 14 of the steering assembly 10.

The neutral position shown corresponds here to a straight-ahead position of the steering assembly 10. In this position, the wheel 12 is not turned in.

The wheel carrier 14 is mounted on a vehicle body 18 via a strut 16.

Furthermore, the steering assembly 10 comprises a first transverse link 20 mounted on the wheel carrier 14 in an articulated manner and a second transverse link 22 mounted on the wheel carrier 14 in an articulated manner.

The first transverse link 20, the second transverse link 22 and the strut 16 are each held on the wheel carrier 14 in a manner spaced apart along a wheel carrier longitudinal direction R.

A wheel-carrier-side bearing 16r of the strut 16 lies here between a wheel-carrier-side bearing 20r of the first transverse link 20 and a wheel-carrier-side bearing 22r of the second transverse link 22.

On the side in each case facing away from the wheel carrier 14, the first transverse link 20 and the second transverse link 22 are coupled to each other via a connecting member 24.

The connecting member 24 is fastened rotatably to the vehicle body 18 via a vehicle-body-side bearing 26.

Figure 2:
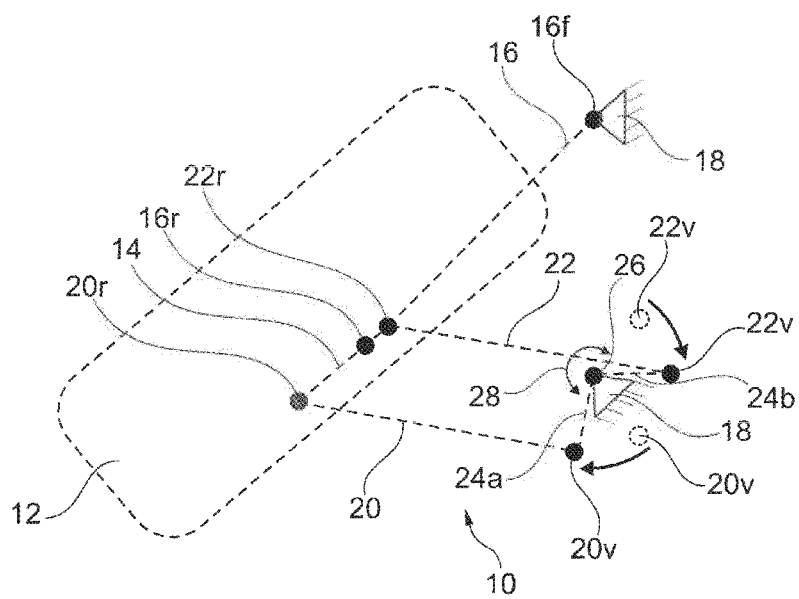
FIG. 2 is a top view of the steering assembly of a motor vehicle in a turned-in state, wherein the steering assembly interacts with a wheel on the outside of the bend.
Figure 3:
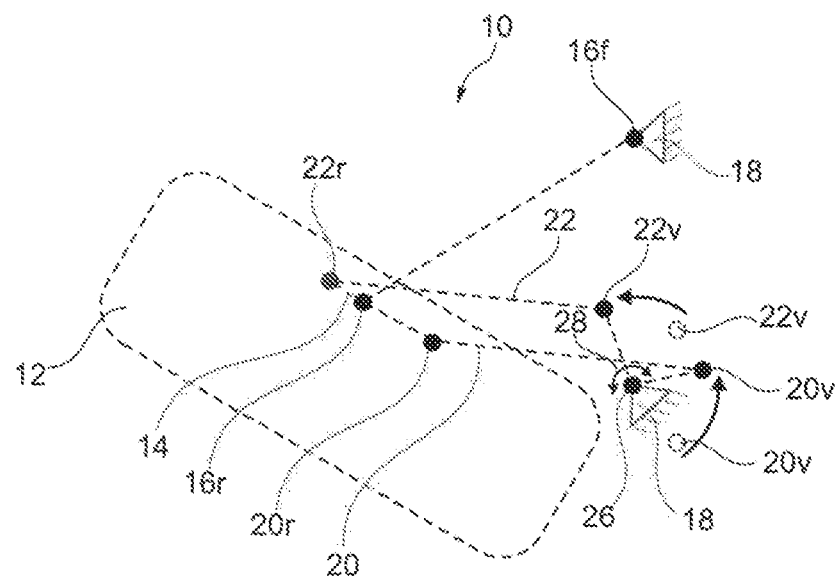
FIG. 3 is a top view of the steering assembly of a motor vehicle in a turned-in state, wherein the steering assembly interacts with a wheel on the inside of the bend.

An axis (not illustrated specifically) which is assigned to the vehicle-body-side bearing 26 is arranged substantially vertically here (also see FIGS. 2 and 3). It therefore projects out of the plane of the drawing.

The vehicle-body-side bearing 26 is also spaced apart from a vehicle-body-side bearing 16f of the strut 16.

The first transverse link 20, the second transverse link 22 and the connecting member 24 lie substantially in a common, horizontally running plane. In FIG. 1, this plane corresponds to the plane of the drawing. In reality, this plane runs substantially parallel to a carriageway (not illustrated specifically).

Furthermore, the first transverse link 20 and the second transverse link 22 run substantially parallel. Furthermore, they are substantially the same length.

The connecting member 24 comprises a first connecting arm 24a which connects the body-side bearing 26 of the connecting member 24 to a connecting-member-side bearing 20v of the first transverse link 20. In addition, the connecting member 24 has a second connecting arm 24b which connects the body-side bearing 26 of the connecting member 24 to a connecting-member-side bearing 22v of the second transverse link 22.

The connecting-member-side bearing 22v and the connecting-member-side bearing 20v are designed here as rotary bearings or ball bearings.

The first connecting arm 24a and the second connecting arm 24b enclose a connecting member angle α. The latter is oriented in such a manner that, in the neutral position of the steering assembly 10 that is shown in FIG. 1, the body-side bearing 26 is offset in relation to the connecting-member-side bearings 20v, 22v of the transverse links 20, 22 in the direction of the wheel carrier 14.

The connecting member angle α is smaller than 180°.

For the actuation of the steering assembly 10, the connecting member 24 is coupled to an actuator assembly 28 which is symbolized by a double arrow.

The connecting member 24 can be actively rotated in relation to the vehicle body 18 by way of the actuator assembly 28.

A motor vehicle 30 can be provided with a steering assembly 10.

Figure 7:
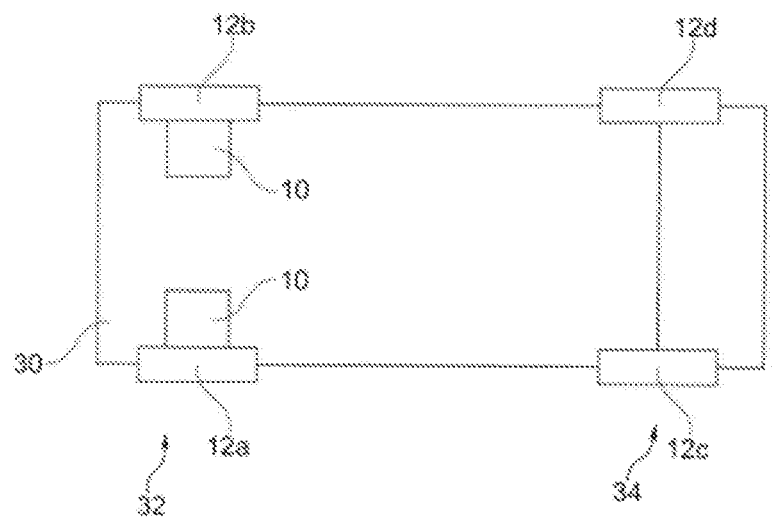
FIG. 7 is a schematic view of a motor vehicle equipped with two steering assemblies to form a steerable motor vehicle axle according to an embodiment of the invention.

The motor vehicle 30 preferably comprises two steering assemblies 10 which complement each other to form a steerable motor vehicle axle 32 (see FIG. 7).

Wheels which are denoted by 12a and 12b in FIG. 7 can be attached here to each of the steering assemblies 10.

In the embodiment illustrated in FIG. 7, the motor vehicle 30 also comprises a non-steerable motor vehicle axle 34 on which wheels 12c, 12d are mounted.

The manner of operation of the steering assembly 10 will be explained with reference to FIGS. 2 and 3.

In FIG. 2, the wheel 12 is a wheel on the outside of the bend. In the configuration illustrated in FIG. 2, the steering assembly 10 therefore performs a right turn.

For this purpose, the connecting member 24 is pivoted in the clockwise direction via the actuator assembly 28.

This has the result that the connecting-member-side bearing 20v of the first transverse link 20 is pivoted from its neutral position (illustrated by dashed lines) about the bearing 26 in the clockwise direction. The same is true of the connecting-member-side bearing 22v of the second transverse link 22.

The strut 16 is formed passively and follows said movement.

In FIG. 3, the wheel 12 is a wheel on the inside of the bend. In the configuration illustrated in FIG. 3, the steering assembly 10 therefore performs a left turn.

Starting from the neutral position of the steering assembly 10 that is illustrated in FIG. 1, the connecting member 24 is now pivoted about the body-side bearing 26 in the counterclockwise direction.

The connecting-member-side bearings 20v, 22v of the transvers links 20, 22 are therefore also pivoted about the bearing 26 in the counterclockwise direction. The wheel 12 is therefore rotated in the opposite direction in comparison to FIG. 2.

For both movements, for example, an instantaneous center of rotation M of the transverse links 20, 22 is at infinity (cf. FIG. 1).

A virtual kingpin axis S lies in the imaginary insecting point of the strut 16 and the axis lying between the instantaneous center of rotation M and the bearing 26 (see FIG. 1).

Figure 4:
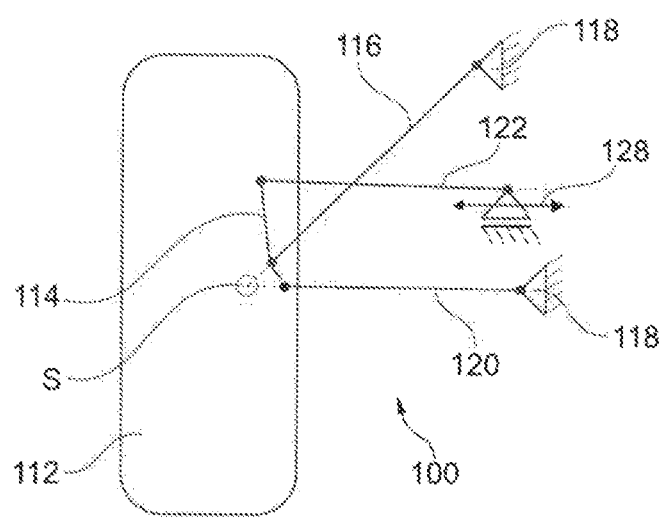
FIG. 4 is a top view of a known steering assembly.
Figure 5:
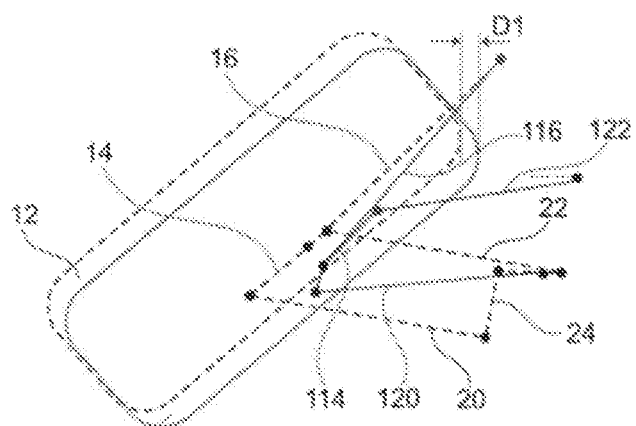
FIG. 5 is a top view of the steering assembly from FIG. 2 in comparison to the known steering assembly from FIG. 4 in a turned-in state, wherein the two steering assemblies each interact with a wheel on the outside of the bend.
Figure 6:
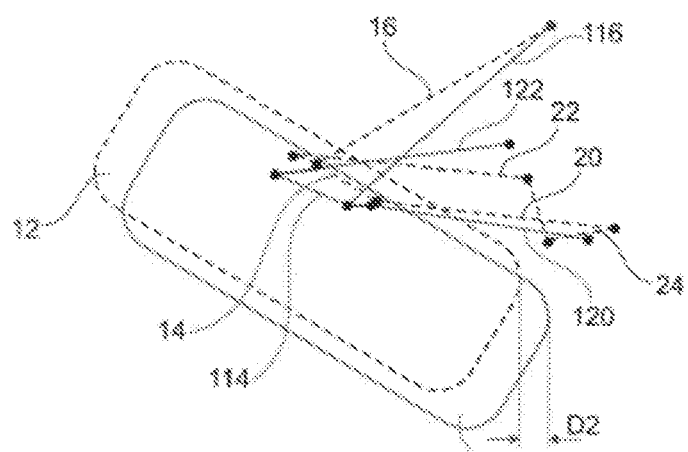
FIG. 6 is a top view of the steering assembly from FIG. 3 in comparison to the known steering assembly from FIG. 4 in a turned-in state, wherein the two steering assemblies each interact with a wheel on the inside of the bend.

In FIGS. 5 and 6, the steering assembly 10 is compared with a known steering assembly 100 which is shown in FIG. 4.

The steering assembly 100 comprises a wheel carrier 114 on which a wheel 112 is mounted, a first and single transverse link 120 via which the wheel carrier 114 is connected to a vehicle body 118, and a strut 116 which likewise connects the wheel carrier 114 to the vehicle body 118.

The steering assembly 100 is actuated via a track rod 122 which is actuable via a linear actuator 128 (illustrated symbolically).

A virtual kingpin axis S of the steering assembly 100 lies at the imaginary intersecting point of the strut 116 and the transverse link 120.

In FIG. 5, both the wheel 12 of the steering assembly 10 according to the invention and the wheel 112 of the steering assembly 100 known from the prior art constitute a wheel on the outside of the bend.

The steering assembly 10 according to the invention is illustrated here in dashed lines and the known steering assembly 100 in solid lines.

The wheels 12, 112 are turned in precisely by the same angle.

It becomes clear here, that, in this state, the wheel 112 lies closer to the vehicle body 18, 118 by a distance D1 than the wheel 12. In other words, the wheel 112 of the steering assembly 100 known from the prior art migrates further by the distance D1 in the direction of a vehicle interior during a turning-in operation than the wheel 12 of the steering assembly 10 according to the invention.

The same is true if the wheels 12, 112 are wheels on the inside of the bend (cf. FIG. 6).

At an identical turning-in angle, the wheel 112 then lies closer by a distance D2 to the vehicle body 18, 118 than the wheel 12. In this situation, the wheel 112 of the steering assembly 100 known from the prior art therefore also migrates further by the distance D2 in the direction of the vehicle interior than the wheel 12 of the steering assembly 10 according to the invention during the turning-in operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering assembly for a motor vehicle, comprising:
a wheel carrier to which a wheel is fastenable;
a strut via which the wheel carrier is mounted on a vehicle body in an articulated manner;
a first transverse link mounted on the wheel carrier in an articulated manner;
a second transverse link mounted on the wheel carrier in an articulated manner; and
a connecting member, wherein the first transverse link and the second transverse link are coupled to each other in each case on their side facing away from the wheel carrier by way of the connecting member, and wherein the connecting member is mounted rotatably on the vehicle body, wherein
the first transverse link, the second transverse link and the connecting member lie in a common, substantially horizontally running plane.

2. The steering assembly according to claim 1, wherein the first transverse link and the second transverse link run substantially parallel and/or are substantially the same length.

3. The steering assembly according to claim 1, wherein the connecting member is coupled to an actuator assembly and is rotatable by the actuator assembly in relation to the vehicle body.

4. The steering assembly according to claim 3, wherein the connecting member is rotatable in relation to the vehicle body substantially about a vertical axis.

5. The steering assembly according to claim 1, wherein the connecting member comprises:
a first connecting arm which connects a body-side bearing of the connecting member to a connecting-member-side bearing of the first transverse link, and
a second connecting arm which connects the body-side bearing of the connecting member to a connecting-member-side bearing of the second transverse link.

6. The steering assembly according to claim 5, wherein the connecting-member-side bearing of the first transverse link and/or the connecting-member-side bearing of the second transverse link are ball bearings.

7. The steering assembly according to claim 5, wherein the first connecting arm and the second connecting arm enclose a connecting member angle facing away from the wheel carrier,
the connecting member angle is less than 180°, and therefore the body-side bearing of the connecting member is offset in relation to the connecting-member-side bearings of the first transverse link and of the second transverse link in the direction of the wheel carrier in a neutral position of the steering assembly.

8. The steering assembly according to claim 1, wherein the first transverse link, the second transverse link and the strut are each mounted on the wheel carrier in a manner spaced apart from one another.

9. The steering assembly according to claim 8, wherein a wheel-carrier-side bearing of the first transverse link and a wheel-carrier-side bearing of the second transverse link are spaced apart from each other along a wheel carrier longitudinal direction.

10. The steering assembly according to claim 9, wherein a wheel-carrier-side bearing of the strut is arranged between the wheel-carrier-side bearing of the first transverse link and the wheel-carrier-side bearing of the second transverse link.

11. The steering assembly according to claim 1, wherein a vehicle-body-side bearing of the strut is spaced apart from a vehicle-body-side bearing of the connecting member.

12. A motor vehicle, comprising:
a steering assembly comprising:
a wheel carrier to which a wheel is fastenable;
a strut via which the wheel carrier is mounted on a vehicle body in an articulated manner;
a first transverse link mounted on the wheel carrier in an articulated manner;
a second transverse link mounted on the wheel carrier in an articulated manner; and
a connecting member, wherein the first transverse link and the second transverse link are coupled to each other in each case on their side facing away from the wheel carrier by way of the connecting member, and wherein the connecting member is mounted rotatably on the vehicle body; and
the wheel is fastened to the wheel carrier, wherein
the first transverse link, the second transverse link and the connecting member lie in a common, substantially horizontally running plane.

13. The motor vehicle according to claim 12, wherein two steering assemblies are provided, wherein the two steering assemblies complement each other to form a steerable motor vehicle axle.

* * * * *